April 29, 1969  E. N. AVERY  3,441,482
SOLAR ENERGY WATER PURIFICATION APPARATUS
Filed Sept. 5, 1967  Sheet 1 of 3
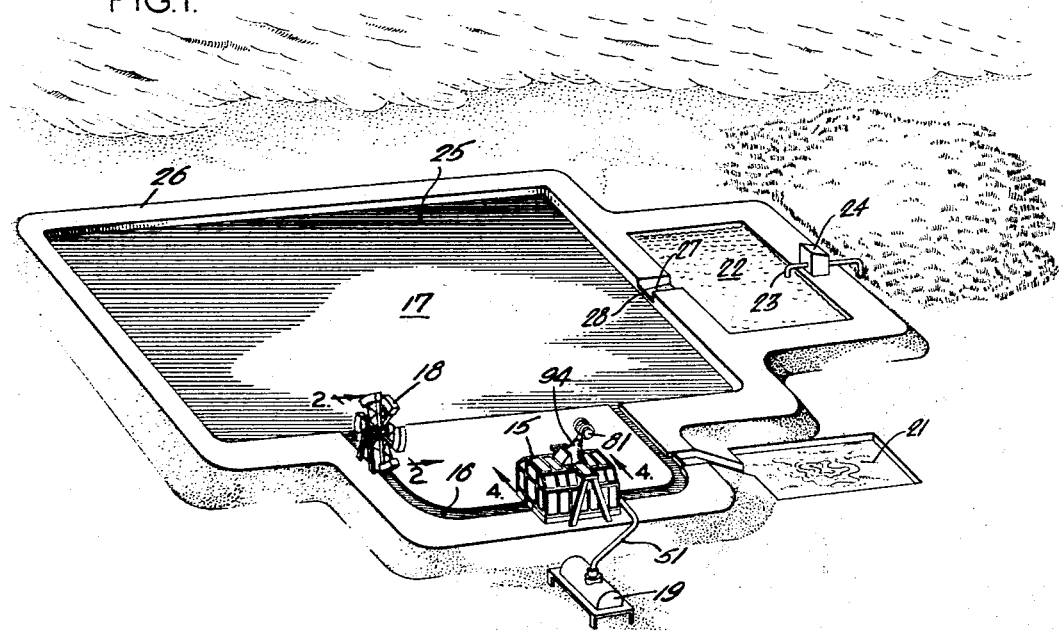
INVENTOR:
EDWARD N. AVERY
BY Howson & Howson
ATTYS

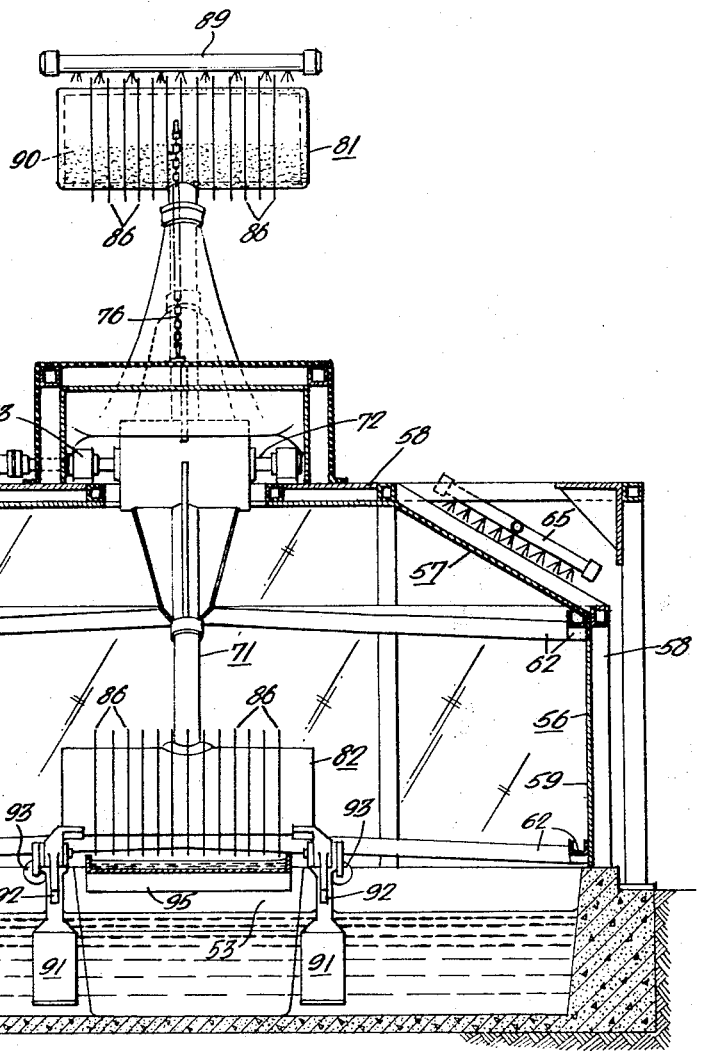

United States Patent Office 3,441,482
Patented Apr. 29, 1969

3,441,482
SOLAR ENERGY WATER PURIFICATION
APPARATUS
Edward N. Avery, 201 N. Grove St.,
Dunmore, Pa. 18512
Filed Sept. 5, 1967, Ser. No. 665,618
Int. Cl. B01d 3/10, 3/08
U.S. Cl. 202—175     13 Claims

ABSTRACT OF THE DISCLOSURE

An apparatus for purification of impure water by humidification using solar energy as a heat source, comprising: an impure water heating pool covered by a material to prevent water evaporation therefrom while promoting absorption of solar energy into the heating pool, a solar energy still having an oscillating thermodynamic motor to aid vaporization of the water therein, and a rotary thermodynamic motor to circulate the impure water between the pool and the still.

Background of the invention

The present invention relates to an apparatus for the recovery of pure water from saline, brackish, or other impure water and has particular application to limited-demand solar energy stills using a humidification process as a means to purify the water. Humidification processes differ from conventional distillation processes in that water is vaporized into relatively dry air and is then condensed from the air on a cold surface. The use of humidification to purify water is advantageous because the energy and mass transfer during the purification takes place at temperatures below the normal boiling point of water. This allows low temperature level heat energy to be used to purify the water.

Many experimental programs have been undertaken to develop low cost saline water conversion apparatus to provide fresh water to those geographic areas having only saline or brackish water or to supplement natural fresh water sources already existing. These programs have produced experimental saline water purification plants which have not been entirely satisfactory in their operation.

A major disadvantage of plants designed prior to the present invention is that they have not been able to economically produce pure water in limited quantities. The prior plants have a relatively high fixed initial cost and in order for the plants to be economically feasible, they must be designed for high capacity water purification. Where the demand for pure water is limited and below their minimum feasible capacity, the cost of such plants makes their use prohibitive.

Another disadvantage of the prior plants is that they require the application of high temperature level heat energy in their purification processes. In certain geographical areas not having readily available sources of oil, coal, electricity or other similar high temperature energy, such plants cannot be used.

Still another disadvantage of the prior plants is the need for a large number of operating personnel to run them. In plants designed to produce limited quantities of water the employment costs substantially raises the cost per gallon of running the plant and sometimes makes use of these plants prohibitively expensive.

The invention

A principal object of the present invention is to provide a novel solar energy water purification apparatus capable of operating in geographical regions having a high incidence of solar energy and low humidity, and in installations where the demand for pure water is limited.

Another objective of the present invention is to provide a novel solar-energy water purification apparatus for the purification of limited quantities of impure water which is highly economical to construct and install, yet which is fully effective in operation and use.

Still another object of the present invention is to provide a novel solar-energy water purification apparatus which is capable of operation in relatively remote geographical regions which do not have high-temperature-level heat energy readily available.

Another object of the present invention is to provide a novel solar-energy distillation apparatus which does not normally require personnel on duty to supervise its operation.

In particular, the present invention provides a novel solar energy water purification installation comprising a solar energy heated pool containing a quantity of impure water; a material covering the pool to prevent water evaporation from the pool while promoting absorption of solar energy into the pool to heat the water; a solar-energy still to receive the heated water to vaporize a portion of it into entrapped air inside the still, and to condense it on cool interior still surfaces; and means, preferably a novel rotary thermodynamic motor to circulate water between the pool and the still. In a preferred embodiment of the invention, the still includes an oscillating thermodynamic motor to assist vaporization of the water into the entrapped air in the still.

Other objects and a fuller understanding of the invention may be had by referring to the following description and claims taken in conjunction with the accompanying drawings wherein:

FIG. 1 is a perspective view of a solar energy water purification installation embodying the present invention;

FIG. 2 is an enlarged sectional view taken along the line 2—2 of FIG. 1 showing the rotary thermodynamic motor to circulate the water through the canal;

FIG. 3 is a sectional view taken along the line 3—3 of FIG. 2;

FIG. 5 is a sectional view taken along the line 5—5 of FIG. 4.

Figure 4:
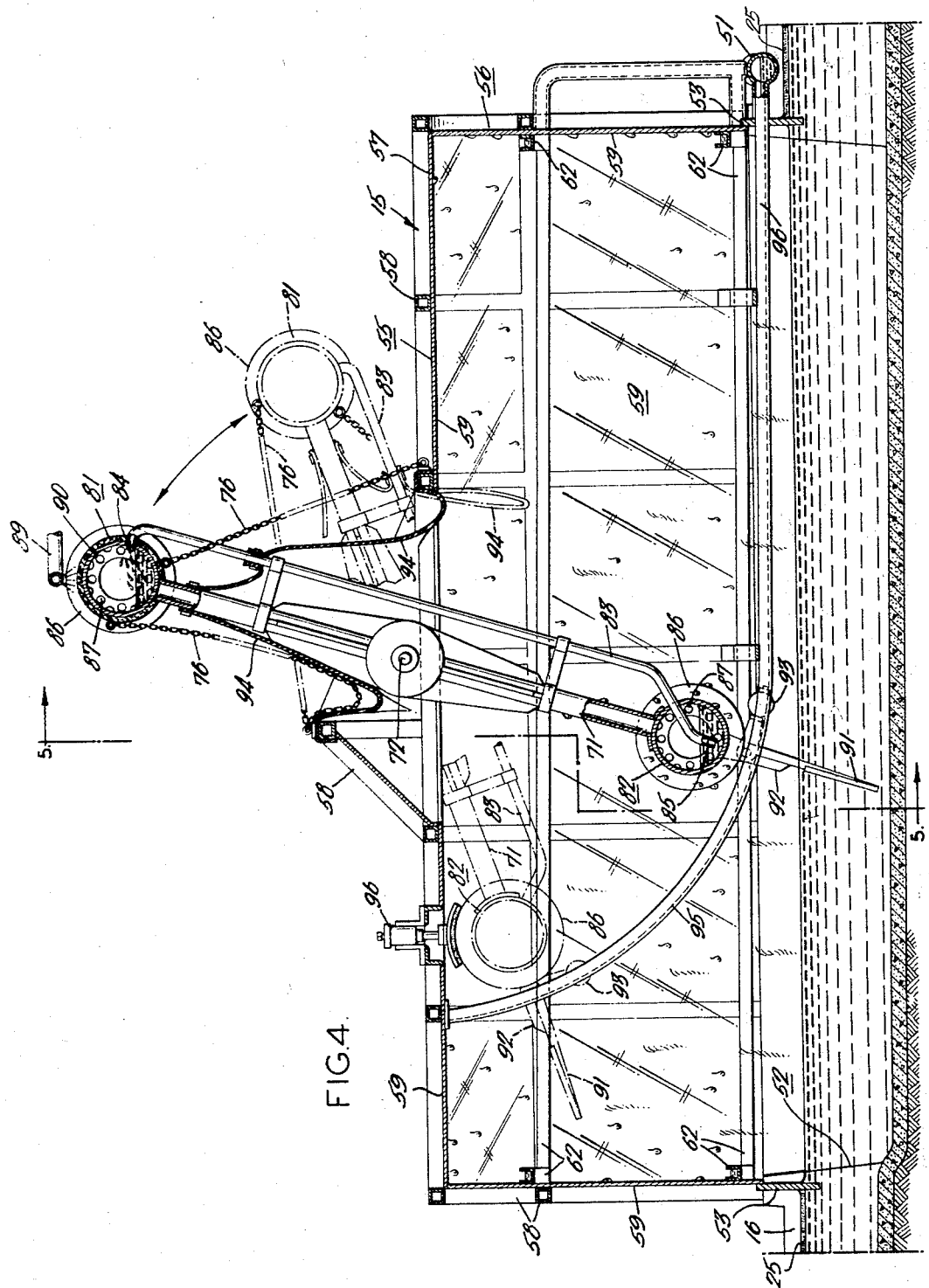
FIG. 4 is an enlarged sectional view taken along the line 4—4 of FIG. 1 showing the still with the oscillating thermodynamic motor.

In accordance with the invention, a solar energy water purification installation is provided having a heating pool filled with saline or other impure water, a solar-energy still with an oscillating thermodynamic motor to promote water vaporization in the still, and a rotary thermodynamic motor to circulate the water through a canal between the pool and the still.

In the preferred embodiment of the invention, as illustrated in FIG. 1, a still 15 is mounted in a canal 16 having impure water flowing therethrough from a pool 17. In the present instance, the canal is U-shaped with the still 15 mounted in the base of the U. Means is provided to circulate the water through the canal 16, in the present instance a rotary thermodynamic motor 18 mounted in the inlet leg of the canal. A portion of the water circulating through the canal 16 is evaporated in the still and is condensed and collected in a reservoir, for example a tank 19 adjacent the still. The evaporation of the pure water from the canal raises the concentration of impurities in the return leg of the canal downstream of the still 15 and a sump 21 is provided adjacent the return leg of the canal 16 to draw off the water with concentrated impurities from the canal. Means is provided to supply water to the pool to make up for the evaporated water collected in the reservoir 19 and the water discharged into the sump 21. In the present instance the water supply includes a settling basin 22 and a supply line 23 having means 24 responsive to the water level in the basin to maintain it full.

In accordance with the invention, the purification installation operates without substantial use of electricity or other generated power, and, when conditions permit, may generate useful power. Such generated power may be stored for use in operating the installation when the climatic conditions are unfavorable, or may be used for other purposes as desired. The primary source of power for operating the installation is solar energy and such other natural sources of power that are available. In the present instance, solar energy is used to elevate the temperature of the water in the pool 17, preferably to a temperature substantially above ambient temperature so that there is a substantial temperature gradient between the ambient temperature and the water temperature in the pool. The efficiency of the pool is further enhanced if a source of hot water is available, as for example from a hot spring. The illustrated installation is designed to employ shallow sources of water so as to reduce the amount of heating required in the pool 17.

The pool 17 is of a substantial area so as to have a large surface exposed to the radiant energy of the sun. To enhance the heating effect of the sun, a suitable cover means is provided over the pool's surface. It has been found that an efficient covering may be a continuous film 25 of dark oil or other suitable film-forming liquid having a density less than that of water and having heat-absorbing properties. The film-forming characteristic of the covering liquid film 25 prevents substantial evaporation of the water underlying the film, and the heat-absorbing character of the film transmits the radiant solar energy to raise the temperature of the water. Where the size of the pool permits, the covering film may be a plastic material such as dark-colored polyethylene sheeting floated on the water and anchored at its edges to the inner walls of the foundation through the inner walls of the pool. If a solid film of this character is employed, means is provided to collect rain water from the surface thereof for transmission directly to the reservoir 19. If it is impractical to use a film as a heat-transmitting cover, floating cover elements such as barges may be used to transmit the solar heat energy into the pool and retard evaporation therefrom.

In the present instance, the pool 17 is formed by a poured concrete foundation 26, but earthen foundations having water-impervious linings may be used. The foundation 26 is provided with a weir 27 to admit surface water from the settling basin 22 into the pool 17, a barrier 28 being provided to prevent the migration of the oil film from the pool 17 into the settling basin. The weir is relatively shallow to insure that warmer surface water flows from the settling basin 22 into the pool. The barrier terminates at its lower end above the bottom of the weir 27 to afford flow of water from the basin 22 into the pool 17. Since the supply has means 24 to keep the basin 22 filled, the weir 27 maintains the pool 17 at the desired level.

As pointed out above, water from the pool 17 is circulated through the canal 16 to supply the still 15, in the present instance the circulation being effected by a thermodynamic motor 18. As shown in FIG. 2, the covering film 25 in the canal 16 is interrupted in the area of the motor 18 for example by barriers 32 positioned upstream and downstream respectively of the motor. As shown in FIGS. 2 and 3, the motor 18 comprises a rotary framework 33 having an axle 34 mounted for rotation in bearings 35 supported on A-frame supports 36. A power-take-off 37 is connected to the axle 34 through a clutch device (not shown) to utilize excess power generated by the motor 18 when the operating conditions permit it. The clutch is deenergized when the operating conditions are substandard to eliminate the drag of the power-take-off 37 from the axle.

In order to utilize the solar energy, the rotary framework 33 includes a series of tanks 42 positioned about the circumference of the framework. In the present instance, the tanks are arcuate in form having a curvature corresponding to the radius of the framework and diagonally opposite pairs of tanks are interconnected by conduits 43 extending through the framework 33 and having open ends 41 adjacent the outer arcuate walls of each tank at the trailing end thereof, reckoned in the direction of rotation of the framework. In the present instance, to increase the efficiency of the motor, the tanks are coated with an absorbent material as indicated at 44 and a spray manifold 45 is positioned adjacent the top of the rotary structure 33 to spray cool water onto the surface of the tank.

In accordance with the invention, a volatile liquid 46 is contained in the tanks to transform the solar energy into useful work. To this end, as shown in FIG. 2, the volume of the volatile liquid 46 within two interconnected tanks is approximately equal to the volume in one of the tanks so as to leave a vapor space above the liquid approximately equal to the liquid volume.

In operation, the volatilization of the liquid in the lower tank of each pair creates a vapor pressure within the lower tank which drives the liquid from the lower tank to the upper tank. The increased volume of liquid in the upper tank partially fills the tank creating an unbalance which causes the framework 33 to rotate slowly counterclockwise as shown in FIG. 2. The volatilization of the liquid 46 in the lower tank is produced by the elevated temperature of the water in the canal 16 which, in turn, raises the temperature of the liquid and increases its vapor pressure. In order to insure as warm a temperature as possible in the inlet leg of canal 16, the canal is relatively shallow at its inlet end and gradually deepens towards the return end. In the top tank, the spray manifold 45 cools the tank and the liquid therein to reduce its vapor pressure thereby further assisting the upward flow of liquid from the lower tank to the upper tank. As the framework 33 rotates counterclockwise, the tank at the bottom rotates out of the water in the canal 16 and the upper passes out of registry with the spray manifold 45. There is still a considerable temperature differential between the upper and lower tanks due to the absorption of the cold water by the coating on the upper tank and the warm water by the coating on the lower tank. This temperature differential maintains the upward flow of the liquid 46 for a limited period until the evaporative cooling of the absorbed water eliminates the temperature differential. At this time, both tanks have been rotated past the horizontal level of the axle 34 so that the ends 41 of the conduit 43 are above the level of the liquid in both the upper and lower tanks thereby permitting vapor flow between the two tanks to equalize the pressures therein. Further rotation of the framework 33 rotates the downwardly moving tanks into the heated water in the canal 16 and the upwardly moving tank into the registry with the spray manifold 44 thereby completing one-half cycle of the motor. Thus the thermodynamic motor utilizes the pressure differentials produced by a volatile liquid to cause the liquid to flow upwardly against gravity whereupon the weight of the liquid at its elevated level produces the rotational force to drive the framework.

The choice of a volatile liquid to be used in the tanks 42 depends primarily upon the vertical height and the temperature difference between the opposed tanks which are connected in pairs. Methylene chloride, or one of the fluorinated hydrocarbons used as refrigerants such as dichloro-tetrafluoro-ethane, dichloro-difluoro-methane or monochloro-difluoro-methane might be used. Propane or even water may be used as a satisfactory volatile liquid under certain operating conditions. Volatile liquids having substantial pressure differentials for small temperature differences are preferred, and commercial tables are readily available to assist in the selection of such liquids.

Depending upon the atmospheric conditions surrounding the motor, the availability of a cool water supply, and the operating characteristics of the volatile liquid will determine the advisability of providing the absorbent coating 44 on the tanks 42 and using the cool water spray manifold 45. For example where the impurities in the pool and canal water consist of a large concentration of chemical impurities, which may tend to accumulate in the absorbent coating 44 the coating should be eliminated. To provide for retention of the water on the surface of the tank, the surface may be etched or sandblasted to cause the tank surface to act in the nature of a wick to retain the water thereon.

The rotation of the motor 18 through the canal causes the water in the canal 16 to flow or circulate therethrough. As illustrated, the counterclockwise rotation of the rotor's framework 33 produces left to right circulation of the water in the canal 16. To further enhance a pumping effect of the motor 18, radial fins 48 are provided on the outer walls of the tanks 42.

Pure water is recovered from the canal in the still 15 and is transferred to the reservoir 19 by means of a discharge tube 51 mounted at the right-hand side of the still as shown in FIG. 4.

As shown in FIGS. 4 and 5, the canal 16 is widened in the area of the still to provide an evaporating basin 52. Barriers 53 are positioned at the entrance and exit ends of the basin 52 to prevent the film 25 on the surface of the canal 16 from interfering with the operation of the still. The basin 52 is enclosed by a shell 55 having vertical sidewalls 56 and a truncated roof 57. In the present instance the sidewalls and roof comprise a metal framework 58 mounting panels 59. The panels 59 are preferably formed of glass or plastic or another rigid material which does not absorb radiant heat, but permits the radiant heat to pass therethrough to heat the interior of the enclosure so that the panels remain relatively cool in comparison to the temperature within the enclosure. The elevated temperature within the enclosure enhances the evaporation of water vapor from the surface of the basin 52 so that an extremely humid atmosphere is generated within the enclosure.

Upon contact with the relatively cool panels 59, the humid atmosphere causes condensation on the inside surface of the panels and the condensed vapor in liquid form travels down the panels and collects in upper and lower gutters 62 positioned respectively at the top and bottom of the vertical walls 56. As shown in FIG. 5, the gutters on the end walls decline outwardly from the center toward the gutters in the sidewalls, and as shown in FIG. 4, the gutters on the sidewalls decline downwardly to the right-hand end of the enclosure and discharge into the discharge line 51 for transfer to the reservoir 19. In order to increase the condensation on the panels 59, spray manifolds 65 (see FIG. 5) spray cool water against the outer surfaces of the panels of the roof 57, the water running down along the vertical walls 56 to cool the same. The water may be supplied from the supply 23 or may be derived from another source which may have a lower temperature.

In accordance with another feature of the invention, means is provided to agitate the water in the basin 52 to break up the surface and increase the evaporation. Preferably the agitating means comprises an oscillating thermodynamic motor utilizing the temperature differential between the inside and the outside of the enclosure to transfer volatile liquid between tanks at the opposite ends of an oscillating arm. To this end the motor of the still comprises an oscillating arm 71 mounted on an axle 72 journalled in the framework 58 as indicated at 73 and having a power takeoff unit 74 coupled thereto by clutch mechanism (not shown). The arm is free to oscillate between an upright limit position shown in full lines in FIG. 4 and a tilted limit position shown in broken lines in FIG. 4, the movement being limited by stop means, in the present instance in the form of chains 76 connected between the upper end of the arm and the framework as shown in FIG. 4.

Upper and lower tanks 81 and 82 are mounted at the opposite ends of the arm 71 and fluid communication between the tanks is provided by a conduit 83 opening into the side of the upper tank 81 as indicated at 84 and opening into the bottom of the lower tank 82 as indicated at 85. In the upright limit position of the oscillating arm 71, the opening 84 is above the liquid level in the tank 81 and the opening 85 is below the liquid level in tank 82. In the tilted limit position of the arm 71, on the other hand, the opening 84 is below the liquid level in the tank 81 and the opening 85 is above the liquid level in the tank 82.

In order to increase the efficiency of the unit, the tanks 81 and 82 are provided with heat-transfer fins 86 projecting interiorly and exteriorly of the side wall of the tanks 81 and 82. The fins 86 are perforated interiorly of the tank as indicated at 87 to permit flow of the volatile liquid longitudinally thereof.

In operation, the motor oscillates by the use of solar energy. While different theories of operation have been advanced, it is believed that the following most appropriately describes the operation. With the arm in the upright position shown in full lines in FIG. 4, the vapor pressure in the tank within the enclosure, having a high degree of solar heat energy therein, is greater than the vapor pressure of the liquid in the upper tank 81 which is in the open atmosphere. To increase this pressure differential, the upper tank may be sprayed with a cooling liquid for example by a spray manifold 89. The reduced vaporized to fill the volume left by the transfer of the volatile liquid upwardly through the transfer conduit 83 to increase the gravitational force on the upper tank and reduce the gravitational force on the lower tank thereby creating a turning moment which displaces the arm 71 to its tilted position. The liquid in the lower tank is vaporized to fill the volume left by the tarnsfer of the liquid to the upper tank and the vaporization tends to cool the lower tank 82 as it rises to the tilted position. By the same token, as the upper tank 81 passes out of registry with the spray manifold 89, its temperature raises to thereby increase the vapor pressure therein. This change in pressure, in addition to the positioning of the outlets 84 and 85 causes the liquid from the upper tank to flow downwardly to the lower tank, the shift in weight returning the arm to the upright position whereupon the cycle is repeated, utilizing the solar heat energy. To obtain maximum cooling effect from the spray manifold 89, the upper tank 81 is preferably coated with an absorbent material 90, or may be etched or sand blasted, to retain the water thereon.

Means is provided to agitate the water in the basin 52 as the arm 71 oscillates between its upright and tilted positions. To this end, a pair of paddles 91 are pivotally mounted on the lower tank 82 and are urged toward a clockwise limit position against a back-up plate 92 by means of a counterweight 93. As the arm 71 oscillates from its upright to its tilted position paddle 91 is free to pivot counterclockwise to reduce the resistance. On the downward stroke of the lower tank 82, the advance of the tank 82 through the water causes the force of the water to urge the paddles 91 against the back-up plates 92 to assist the flow through the basin and to break up the surface tension to enhance the evaporation thereof.

In this manner, the displacement of the arm 71 from the tilted to the upright position is the working stroke of the arm whereas the displacement from the upright position to the tilted position is the return stroke of the arm.

To insure against loss of the moisture-laden air from the interior of the enclosure, a flexible boot is provided at 94 to seal the roof opening through which the oscillating arm 71 projects. Since the lower tank 82 tends to be cooler than the surrounding air in the enclosure due to the evaporation of the liquid therein and the presence of the liquid flowing from the outside tank, a condensate-collecting trough 95 underlies the path of travel of the lower tank 82 so that any moisture condensing on the surfaces of the tank 82 and dripping therefrom will be caught in the collecting trough 95 and will be transferred by a conduit 96 to the main discharge tube 51.

To cushion the impact of the arm 71 on the stop-means as it approaches its upper limit position, a dash-pot 96 is mounted in the roof of the enclosure to engage the lower tank 82 when the arm reaches its tilted position. The dash-pot 96 is provided on the return stroke of the arm 71, but is unnecessary on the working stroke of the arm 71 because of the retarding force supplied by the paddle connected thereto.

Where the climatic conditions are most favorable, the output of the oscillating thermodynamic motor may be used to supply excess power for use in other parts of the distillation apparatus, by means of the power take-off 74. The oscillating power provided by the takeoff 74 may be used directly to drive pumps or the like or may be connected to a generator to generate electricity for transmission to other areas. The power unit 74 has a clutch (not shown) which is disconnected when the climatic conditions are unfavorable and there is not an excess of power.

While a particular embodiment of the present invention has been herein illustrated and described, it is not intended to limit the invention to such disclosure, but changes and modifications may be made therein and thereto within the scope of the following claims.

I claim:

1. Apparatus for the purification of impure water by means of solar energy comprising a solar-energy-heated pool having a quantity of heated water therein, a still having a basin and a shell substantially enclosing said basin, means to circulate heated water from said pool and through said basin to maintain a supply of heated water therein, said shell being of a material to transmit solar heat energy therethrough to heat said enclosure without substantially heating the material of said shell, whereby the shell is maintained at a temperature below the temperature within said enclosure, the enclosure being operable to entrap moisture evaporated from said basin therein and to condense said moisture on the material of said shell, and means to collect the moisture condensed on the interior of said shell, said means to circulate the water through said basin including a canal interconnecting said basin with said pool and a rotary thermodynamic motor mounted in said canal comprising a rotary framework having a series of tanks positioned about the circumference thereof, said tanks being disposed in diametrically opposite pairs, means interconnecting each pair of tanks including a conduit opening into each tank of the pair adjacent its outer wall, a body of volatile liquid enclosed in each pair of tanks, means mounting said rotary structure for rotation to cause said tanks in the series to pass into the canal at the bottom of its path of rotation as said structure rotates, said tanks in the lower position being heated by said canal water to increase the temperature of the volatile liquid therein above the temperature of the liquid in the upper tank of said pair to cause said liquid to flow through said conduit from the lower tank to the upper tank of said pair, the weight of the liquid transferred whereby effecting rotation of said structure.

2. Apparatus according to claim 1 wherein said tanks are arcuate in form and said conduit openings are positioned adjacent the trailing end of the outer wall of each tank reckoned in the direction of rotation thereof.

3. Apparatus according to claim 2 including a spray manifold in registry with the upper position of said tanks to supply cool water to said upper tank to further increase the temperature differential between said upper and lower tanks.

4. Apparatus according to claim 1 including cover means overlying said pool and operable to transit solar heat energy therethrough to heat the pool and at the same time to retard evaporation of water from said pool.

5. Apparatus according to claim 4 wherein said cover means comprises a film of dark oil floating on said pool.

6. Apparatus according to claim 5 including means to supply impure water to said pool to maintain the level thereof substantially constant, including a settling basin connected to said pool through a weir, a barrier in said weir to prevent migration of the oil film from said pool into said settling basin, and means to supply impure water to said settling basin.

7. An apparatus for purification of saline water according to claim 1, including an oscillating thermodynamic motor in said still having an arm with a pivot axle intermediate its ends, stop means to limit said arm to rotate between an upright and tilted position, an upper tank mounted at one end of said arm and a lower tank mounted at the other end of said arm, a conduit connecting said tanks, a volatile liquid substantially filling at least one of said tanks, said liquid being transferable by heat energy between said tanks through said conduit to shift the center of gravity of said pair of tanks about said axle to cause said arm to oscillate between said upright and tilted positions, and means carried by said arm to agitate the water in said basin to thereby increase its surface area exposed to said air and assist evaporation of said water.

8. An apparatus for purification of saline water according to claim 7, including a spray manifold mounted adjacent the position of said upper tank when said arm is in the upright position, said manifold spraying cold water on said upper tank in said upright position to lower its temperature below ambient air temperature and thereby lower said volatile liquid vapor pressure in said upper tank below said volatile liquid vapor pressure in said lower tank, whereby said difference in vapor pressures between said tank forces said volatile liquid from said lower tank through said conduit to said upper tank; and the weight of said volatile liquid in said upper tank causes said arm to move to said tilted position disposing said upper tank away from said spray manifold whereby said upper tank returns to said ambient air temperature equalizing said vapor pressure in said tanks and said liquid flows by gravity back to said lower tank causing said volatile liquid weight in said lower tank to move said arm back to said upright position.

9. An apparatus for purification of saline water as in claim 7, wherein said lower tank is suspended at the other end of said arm in said still above the surface of said water in said basin and said means to agitate the water in said basin comprises paddles mounted on said lower tank which assist the flow of said water through said basin and break up the surface tension of said water to enhance the evaporation thereof.

10. An apparatus for purification of saline water as in claim 1, including a cover means disposed over substantially the entire surface of said pool, said cover preventing evaporation of said water from said pool and being heat-absorbing to receive radiant solar energy for transmission into said pool to heat said water.

11. An apparatus for purification of saline water as in claim 10, wherein said cover means comprises continuous film of dark oil floated on said surface of said water in said pool.

12. An apparatus for purification of saline water as in claim 1, wherein said shell of said still comprises four vertical sidewalls positioned surrounding said basin, a roof mounted on said sidewalls and cooperating with said sidewalls to entrap said air above said water surface in said basin.

13. An apparatus for purification of saline water as in claim 12, including a spray manifold adjacent the outside of said shell to direct water onto said shell for cooling said shell sidewalls and roof and thereby increase the condensation of said vapor from said entrapped air.

References Cited

UNITED STATES PATENTS

| 2,006,985 | 7/1935 | Claude et al. | 202—234 X |
|---|---|---|---|
| 2,759,245 | 8/1956 | Tigrett et al. | 60—25 X |
| 3,067,572 | 12/1962 | Baumgartner | 60—25 |
| 3,257,291 | 6/1966 | Gerber | 202—234 |

NORMAN YUDKOFF, *Primary Examiner.*

F. E. DRUMMOND, *Assistant Examiner.*

U.S. Cl. X.R.

202—234, 238; 203—10; 60—25

PO-1050
(5/69)

UNITED STATES PATENT OFFICE
CERTIFICATE OF CORRECTION

Patent No. 3,441,482          Dated April 29, 1969

Inventor(s) Edward N. Avery

It is certified that error appears in the above-identified patent and that said Letters Patent are hereby corrected as shown below:

Column 6, line 42; delete "vaporized.... of the" and insert --vapor pressure in the upper chamber 81 draws the--; line 48, change "tarnsfer" to --transfer--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents